United States Patent [19]

Araki et al.

[11] Patent Number: 5,220,265
[45] Date of Patent: Jun. 15, 1993

[54] DISCRETE-TYPE REPETITIVE CONTROL METHOD AND AN APPARATUS THEREFOR

[75] Inventors: Mitsuhiko Araki, Kyoto; Keiji Sakamoto, Hachioji; Yasusuke Iwashita, Oshino, all of Japan

[73] Assignee: Fanuc Ltd., Minamitsuru, Japan

[21] Appl. No.: 778,806

[22] PCT Filed: Apr. 20, 1991

[86] PCT No.: PCT/JP91/00528
§ 371 Date: Feb. 14, 1992
§ 102(e) Date: Feb. 14, 1992

[87] PCT Pub. No.: WO91/16674
PCT Pub. Date: Oct. 31, 1991

[30] Foreign Application Priority Data

Apr. 20, 1990 [JP] Japan ................. 2-103058

[51] Int. Cl.⁵ ............................................. G05B 21/02
[52] U.S. Cl. ..................... 318/610; 318/609;
318/561; 364/148; 364/165
[58] Field of Search ................. 318/560-632;
360/72-78; 364/131-169

[56] References Cited

U.S. PATENT DOCUMENTS

| | | |
|---|---|---|
| 3,988,538 | 10/1976 | Patten . |
| 4,904,912 | 2/1990 | Yamamoto ................. 318/561 |
| 4,918,584 | 4/1990 | Goff ........................... 364/165 |
| 5,050,119 | 9/1991 | Lish ............................ 364/724.16 |
| 5,065,263 | 11/1991 | Yoshida et al. ............ 360/77.03 |
| 5,119,287 | 6/1992 | Nakamura et al. ........ 364/148 |

Primary Examiner—Paul Ip
Attorney, Agent, or Firm—Staas & Halsey

[57] ABSTRACT

A discrete-type repetitive control unit which enables stable repetitive control even if a state variable of a controlled object is not observable, using time delay elements ($Z^{-1}$). The number of time delay elements is equal to or greater than a value obtained by dividing a cycle period of a cyclic target input by a period of sampling the deviation between a controlled object output and the cyclic target input. Periodically applied to each of the time delay elements is a sum obtained by adding the product of the deviation and a first gain ($h1, \cdots, hn$) associated with the time delay element, to the product of an input ($u(k)$) of the controlled object and a second gain ($m1, \cdots, mn$) associated with the time delay element, and to an output ($Wn(n+n), \cdots, W1(k+1)$) of a preceding element. The control unit periodically applies to the controlled object a sum ($u(k)$) obtained by adding the product of the deviation and a third gain ($h0$) to an output ($W1(k)$) of the last time delay element. The control unit achieves a stable operation of the controlled object with the flexibility to respond to variation in the cycle period of the target input and without causing a delay in following the target input which periodically changes in a single changing pattern.

6 Claims, 4 Drawing Sheets

DISCRETE-TYPE REPETITIVE CONTROL METHOD AND AN APPARATUS THEREFOR

BACKGROUND OF THE INVENTION

1. Field of the Invention

The present invention relates to repetitive control for causing a controlled object to conduct a repetitive action in response to a cyclic target input, and more particularly, to a discrete-type repetitive control method and an apparatus therefor, having an excellent response to a cyclic target input and excellent flexibility to a variation in the cycle period of a target input.

2. Description of the Related Art

Conventionally, it has been known to control a controlled object in a manner causing the object to repeat a single patterned action, by the use of a discrete-type repetitive control system which is constituted in accordance with an internal model principle and adapted to receive a cyclic target input which changes in a single changing pattern periodically repeated. According to the internal model principle, it is possible to cause an output of the controlled object to follow a target input with no steady deviation, by incorporating a target input generation model in a closed loop of the control system. Conventionally, in view of the internal model principle, a discrete-type repetitive control system has been so designed as to stabilize an extended system which is configured by connecting a compensator, including the target input generation model, to the controlled object.

In this case, a cyclic target input generation model represented by $1/(Z^L - 1)$ is employed, in view of equation (3) obtained by substituting equation (2) into a Z transform $Yr(Z)$ of a cyclic target input $y(t)$ represented by equation (1). In equations (1)–(3), symbols $Z^{-i}$ ($i=1, 2, \cdots, L, 2L, \cdots$) each represent a time delay element, and symbol L represents the cycle of the cyclic target input.

$$Yr(Z) = r_0 + r_1 Z^{-1} + \ldots + r_{L-1} Z^{L-1} + \quad (1)$$
$$(r_0 + r_1 Z^{-1} + \ldots + r_{L-1} Z^{L-1}) Z^{-L} +$$
$$(r_0 + r_1 Z^{-1} + \ldots + r_{L-1} Z^{L-1}) Z^{-2L} + \ldots$$
$$Yr0(Z) = r_0 + r_1 Z^{-1} + \ldots + r_{L-1} Z^{L-1} \quad (2)$$
$$Yr(Z) = Z^L \cdot Yr0(Z)/(Z^L - 1) \quad (3)$$

Namely, as shown in FIG. 1, the conventional disorete-type repetitive control system accommodates therein an internal model $1/(Z^L - 1)$ which is comprised of L' time delay elements $Z^{-1}$. The number L' of the time delay elements $Z^{-1}$ is equal to a value obtained by dividing the cycle period L of the cyclic target input by a sampling cycle period $\tau$ of the cyclic target input in the control system. In FIG. 1, symbol $yr(i)$ represents the cyclic target input; $u(i)$, an input to the controlled object; and $y(i)$, an output of the controlled object. Symbol $x(i)$ indicates a state variable of the controlled object; and $e(i)$, a deviation between the output $y(i)$ of the controlled object and the cyclic target input $yr(i)$. Further, symbol h represents a feedback gain element having a properly selected gain, and K1–KL indicate gain compensators having properly selected gains.

According to the repetitive control system, a stable control system is provided. However, if the state variable $x(i)$ cannot be observed directly, then the repetitive control system shown in FIG. 1 cannot be configured. Further, according to the control system, the number L' of the time delay elements $Z^{-1}$ must be equal to the value obtained by dividing the cycle L of the target input by the sampling cycle $\tau$. Therefore, the conventional repetitive control system lacks flexibility to a variation in the cycle period of a target input.

SUMMARY OF THE INVENTION

An object of the present invention is to provide a discrete-type repetitive control method and an apparatus therefor, which enable stable repetitive control even if a state variable of a controlled object is not observable, and which have an excellent response to a cyclic target input and excellent flexibility to a variation in the cycle period of a target input.

To achieve the aforementioned object, according to one aspect of the present invention, a discrete-type repetitive control method comprises the steps of: (a) periodically applying, to each of time delay elements which are equal to or greater in number than a value obtained by dividing a cycle period of a cyclic target input by a cycle period of sampling a deviation between an output of a controlled object and the cyclic target input, a sum of a product of the deviation periodically sampled and a first gain associated with the time delay element, a product of an input to the controlled object and a second gain associated with the time delay element, and an output of a preceding time delay element; and (b) periodically applying, to the controlled object, a sum of a product of the periodically sampled deviation and a third gain, and an output of a time delay element disposed on a side of the controlled object.

According to another aspect of the present invention, a discrete-type repetitive control unit comprises: (a) time delay elements which are equal to or greater in number than a value obtained by dividing a cycle period of a cyclic target input by a cycle period of sampling a deviation between an output of a controlled object and the cyclic target input, the time delay elements being connected in series with each other; (b) first gain elements each disposed on an input side of a corresponding one of the time delay elements; (c) first adder elements each interposed between a corresponding one of the time delay elements and a corresponding one of the first gain elements; (d) second gain elements each interposed between an input side of the controlled object and a corresponding one of the first adder elements; (e) a second adder element interposed between the input side of the controlled object and a last time delay element connected thereto; and (f) a third gain element disposed on an input side of the second adder element.

As described above, according to the present invention, there are provided time delay elements which are equal to or greater in number than the value obtained by dividing the cycle period of the cyclic target input by the sampling period of the deviation between the controlled object output and the cyclic target input. Each time delay element is periodically applied with the sum of the product of a periodically sampled deviation and the first gain associated with each time delay element, the product of an input to the controlled object and the second gain associated with each time delay element, and an output of the preceding time delay element. Further, the sum of the product of the periodically sampled deviation and the third gain, and an output of the time delay element disposed on the controlled object side is periodically applied to the controlled object.

Unlike the conventional repetitive control wherein the input to the controlled object is changed in accordance with the state variable of the controlled object, according to the present invention, it is possible to perform repetitive control without the need of using the state variable of the controlled object. Thus, stable repetitive control of the controlled object can be achieved even if the state variable of the controlled object is not observable directly. Since the input to the controlled object is generated on the basis of the deviation periodically sampled, a response delay, generated in a repetitive control system and the controlled object, to the cyclic target input can be reduced. Furthermore, it is not inevitably necessary to provide the repetitive control system with the time delay elements $Z^{-1}$ whose number is just equal to the value obtained by dividing the cycle period of the cyclic target input by the sampling cycle of the deviation, as long as the number of the elements is equal to or greater than the aforementioned value. Thus, the repetitive control system is excellent in providing flexibility of control when there is a variation in the cycle period of the cyclic target input.

DESCRIPTION OF THE PREFERRED EMBODIMENT

In the following, a process of deriving a feedback control rule for embodying a repetitive control method, according to an embodiment of the present invention, will be explained. At first, a feedback control rule in the extended system shown in FIG. 2 and consisting of a controlled object and n time delay elements $Z^{-1}$ connected thereto will be determined.

Figure 2:
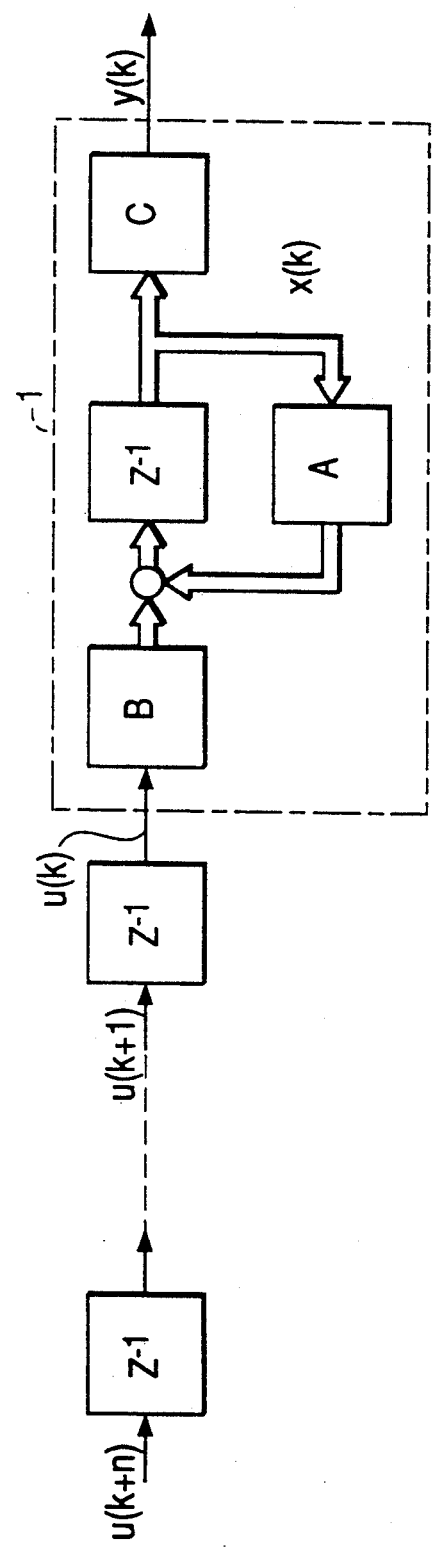
FIG. 2 is a block diagram showing an extended system consisting of a controlled object and time delay elements, for illustration of a process of deriving a feedback control rule of the repetitive control method according to an embodiment of the present invention.

Referring to FIG. 2, a cyclic target input u(iτ) is applied at intervals of a cycle period T to the input side of the extended system, and the target input u(iτ) is sampled at intervals of a sampling period τ. Symbol iτ (i=0, 1, 2, ---, k+n, ---) each indicate a sampling point. The cyclic target input u(iτ) changes in a single changing pattern (not shown), and the changing pattern is repeated at intervals of a cycle period T. The total number n of the time delay elements $Z^{-1}$ is equal to or greater than a value obtained by dividing the period T of the target input u(iτ) by the sampling period τ. Preferably, the number of delay elements $Z^{-1}$ is equal to an integer obtained by rounding up, i.e., counting fractions of decimals of the resultant value of division as a whole number.

An output side of each of the n time delay elements $Z^{-1}$ is connected to the input side of the next time delay element $Z^{-1}$, and the output side of the n-th time delay element $Z^{-1}$ is connected to the input side of a controlled object 1. The controlled object 1, which is a robot, machining tool or the like, includes gain elements A, B, and C whose gains are A, B, and C, respectively, and a time delay element $Z^{-1}$. The output of the time delay element $Z^{-1}$, indicative of a state variable x of the controlled object 1, is applied to the input side of the time delay element $Z^{-1}$ through the gain element A.

The state variable x(k+1) of the controlled object 1 at a given sampling point k+n+1 is represented by equation (4), i.e., by the state variable x(k) at the preceding sampling point k+n, the input u(k) to the controlled object 1, and the gains A and B. Further, an output y(k) of the controlled object 1 is represented by equation (5), i.e., by the state variable x(k) and the gain C.

$$x(k+1) = Ax(k) + Bu(k) \qquad (4)$$

$$y(k) = Cx(k) \qquad (5)$$

From equation (4) and equalities of u(k+1)=u(k+1), ---, u(k+n)=u(k+n), we obtain equation (6) indicative of the feedback control rule in the extended system shown in FIG. 2. In equation (6), symbols A, B, and x indicate matrixes.

$$\begin{bmatrix} x(k+1) \\ u(k+1) \\ u(k+2) \\ \vdots \\ u(k+n-1) \\ u(k+n) \end{bmatrix} = \begin{bmatrix} A & B & 0 & \ldots & 0 \\ 0 & 0 & 1 & \ldots & 0 \\ \vdots & & & & \vdots \\ 0 & 0 & 0 & \ldots & 1 \\ 0 & 0 & 0 & \ldots & 0 \end{bmatrix} \begin{bmatrix} X(K) \\ u(k) \\ u(k+1) \\ \vdots \\ u(k+n-1) \end{bmatrix} + \begin{bmatrix} 0 \\ \vdots \\ \vdots \\ 0 \\ 1 \end{bmatrix} \leftarrow u(k+n) \qquad (6)$$

From equations (4) and (5), we obtain the following n+1 equations.

$$y(k) = Cx(k)$$
$$y(k+1) = Cx(k+1) = CAx(k) + CBu(k)$$
$$y(k+2) = Cx(k+2)$$
$$\qquad = CA^2x(k) + CABu(k) + CBu(k+1)$$
$$\vdots$$
$$y(k+n) = Cx(k+n)$$
$$\qquad = CA^nx(k) + CA^{n-1}Bu(k) +$$
$$\qquad CA^{n-2}Bu(k+1) + \ldots + CBu(k+n-1)$$

From the n+1 equations given above, we obtain equation (7).

$$\begin{bmatrix} C \\ CA \\ \vdots \\ \vdots \\ CA^n \end{bmatrix} x(k) = \begin{bmatrix} y(k) \\ y(k+1) \\ \vdots \\ \vdots \\ y(k+n) \end{bmatrix} - \qquad (7)$$

-continued
$$\begin{bmatrix} 0 & 0 & \ldots & 0 \\ CB & 0 & \ldots & 0 \\ CAB & CB & \ldots & 0 \\ \vdots \\ CA^{n-1}B & CA^{n-2}B & \ldots & CB \end{bmatrix} \begin{bmatrix} u(k) \\ \vdots \\ u(k+n-1) \end{bmatrix}$$

Assuming that there is a matrix H(hn - - - h0) which satisfies equation (8) given below, the feedback control rule represented by equation (6) may be modified as shown in equation (9).

$$H \begin{bmatrix} C \\ CA \\ \vdots \\ CA^n \end{bmatrix} = kn + 1 \qquad (8)$$

$$u(k+n) = -[kn+1, kn, \ldots, k1] \begin{bmatrix} x(k) \\ u(k) \\ \vdots \\ u(k+n-1) \end{bmatrix}$$

$$= -kn + 1\, x(k) - kn u(k) - kn - 1\, u(k+1) - \ldots - k1\, u(k+n-1)$$

$$= -H \begin{bmatrix} C \\ CA \\ \vdots \\ CA^n \end{bmatrix} x(k) - kn \cdot u(k) - kn - 1 \cdot u(k+1) \ldots -k1\, u(k+n-1)$$

$$= -H \begin{bmatrix} y(k) \\ y(k+1) \\ \vdots \\ y(k+n) \end{bmatrix} -$$

$$\begin{bmatrix} 0 & 0 & \ldots & 0 \\ CB & 0 & \ldots & 0 \\ CAB & CB & \ldots & 0 \\ \vdots \\ CA^{n-1}B & CA^{n-2}B & \ldots & 0 \end{bmatrix} \begin{bmatrix} u(k) \\ \vdots \\ u(k+n-1) \end{bmatrix} -$$

$$kn\, u(k) - kn - 1\, u(k+1) - \ldots - k1\, u(k+n-1)$$

$$= [hn, hn-1, \ldots, h0] \begin{bmatrix} y(k) \\ y(k+1) \\ \vdots \\ y(k+n) \end{bmatrix} + \quad (54n)$$

$$[mn, mn-1, \ldots, m1] \begin{bmatrix} u(k) \\ u(k+1) \\ \vdots \\ u(k+n-1) \end{bmatrix}$$

$$= mn\, u(k) + mn-1\, u(k+1) + \ldots + m1\, u(k+n-1) - hn\, y(k) - \ldots - h1\, y(k+n-1) - h0\, y(k+n),$$

where $$\widetilde{Gn} = H \begin{bmatrix} 0 \\ CB \\ CAB \\ \vdots \\ CA^{n-1}B \end{bmatrix}$$

$$\widetilde{Gn-1} = H \begin{bmatrix} 0 \\ 0 \\ CB \\ \vdots \\ CA^{n-2}B \end{bmatrix} \ldots \widetilde{G1} = H \begin{bmatrix} 0 \\ \vdots \\ CB \end{bmatrix}, \text{ and}$$

$mi = \widetilde{HGi} - ki$ for $(i = 1 \text{ to } n)$.

Figure 3:
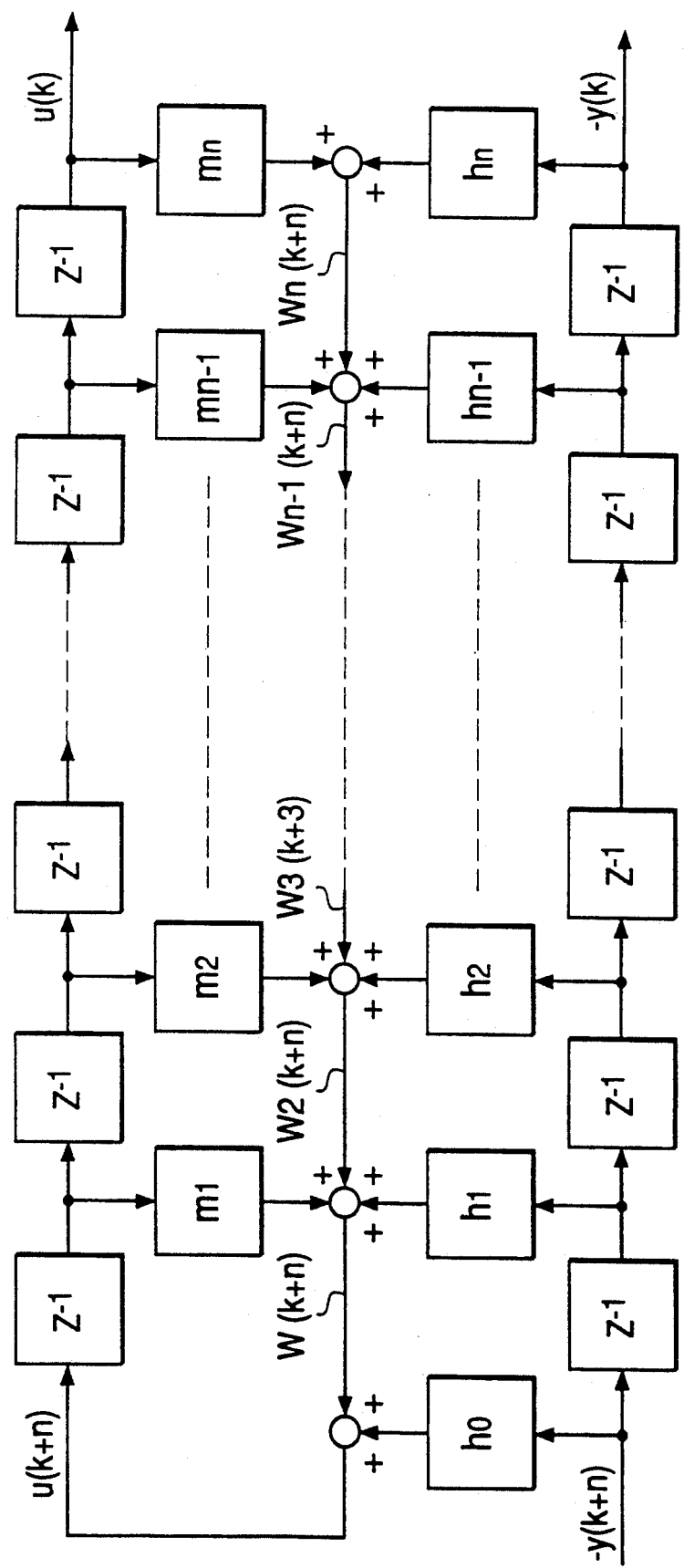
FIG. 3 is a block diagram showing an apparatus, obtained during the course of deriving the feedback control rule, for embodying the feedback control rule.

The feedback control rule represented by the equation (9) does not include the state variable x of the controlled object 1. Thus, the feedback control rule can be executed by the control unit shown in FIG. 3. In FIG. 3, symbol u(k+n) indicates a cyclic target input sampled at a sampling point k+n. Symbol u(k) indicates an input to the controlled object 1 (FIG. 2) at a sampling point k+n, and symbol −y(k) indicates the additive inverse of an output of the controlled object 1. Symbols h0-hn and m1-mn respectively indicate the gains of the gain elements shown by blocks, and Wi(k+n) each indicate an output of the i-th (i=1, 2, - - - , n) adder element illustrated.

In view of FIG. 3, the following n equations are fulfilled.

$$Wn(k+n) = mn\, u(k) - hn\, y(k) \qquad (10\text{-}1)$$
$$Wn-1(k+n) = mn-1\, u(k+1) - \qquad (10\text{-}2)$$
$$hn-1\, y(k+1) + Wn(k+n)$$
$$\vdots$$
$$W2(k+n) = m2\, u(k+n-2) - \qquad (10\text{-}n\text{-}1)$$
$$h2\, y(k+n-2) + W3(k+n)$$
$$W1(k+n) = m1\, u(k+n-1) - \qquad (10\text{-}n)$$
$$h1\, y(k+n-1) + W2(k+n)$$

By combining, equation (10-1) through equation (10-n), we obtain equation (11).

$$\begin{aligned} W1(k+n) &= mn\, u(k) + mn-1\, u(k+1) + \ldots + \\ & m1\, u(k+n-1) - \ldots - \\ & h1\, y(k+n-1) \\ &= u(k+n) + h0\, y(k+n) \end{aligned} \qquad (11)$$

From equation (11), we obtain
$$u(k+n) = W1(k+n) - h0\, y(k+n) \qquad (12)$$

$$u(k) = W1(k) - h0\, y(k) \tag{13}$$

By substituting $k+n-1, \cdots, k+3, k+2,$ and $k+1$ for the variable $k+n$ indicative of a sampling point and contained in equation (10-2) to equation (10-n), we obtain equation (14-2) to equation (14-n). Meanwhile, equation (10-1) is shown again.

$$Wn(k+n) = mn\, u(k) - hn\, y(k) \tag{10-1}$$
$$Wn-1(k+n-1) = mn-1\, u(k) - \tag{14-2}$$
$$hn-1\, y(k) + Wn(k+n-1)$$
$$\vdots$$
$$W2(k+2) = m2\, u(k) - h2\, y(k) + W3(k+2) \tag{14-n-1}$$
$$W1(k+1) = m1\, u(k) - h1\, y(k) + W2(k+1) \tag{14-n}$$

Figure 1:
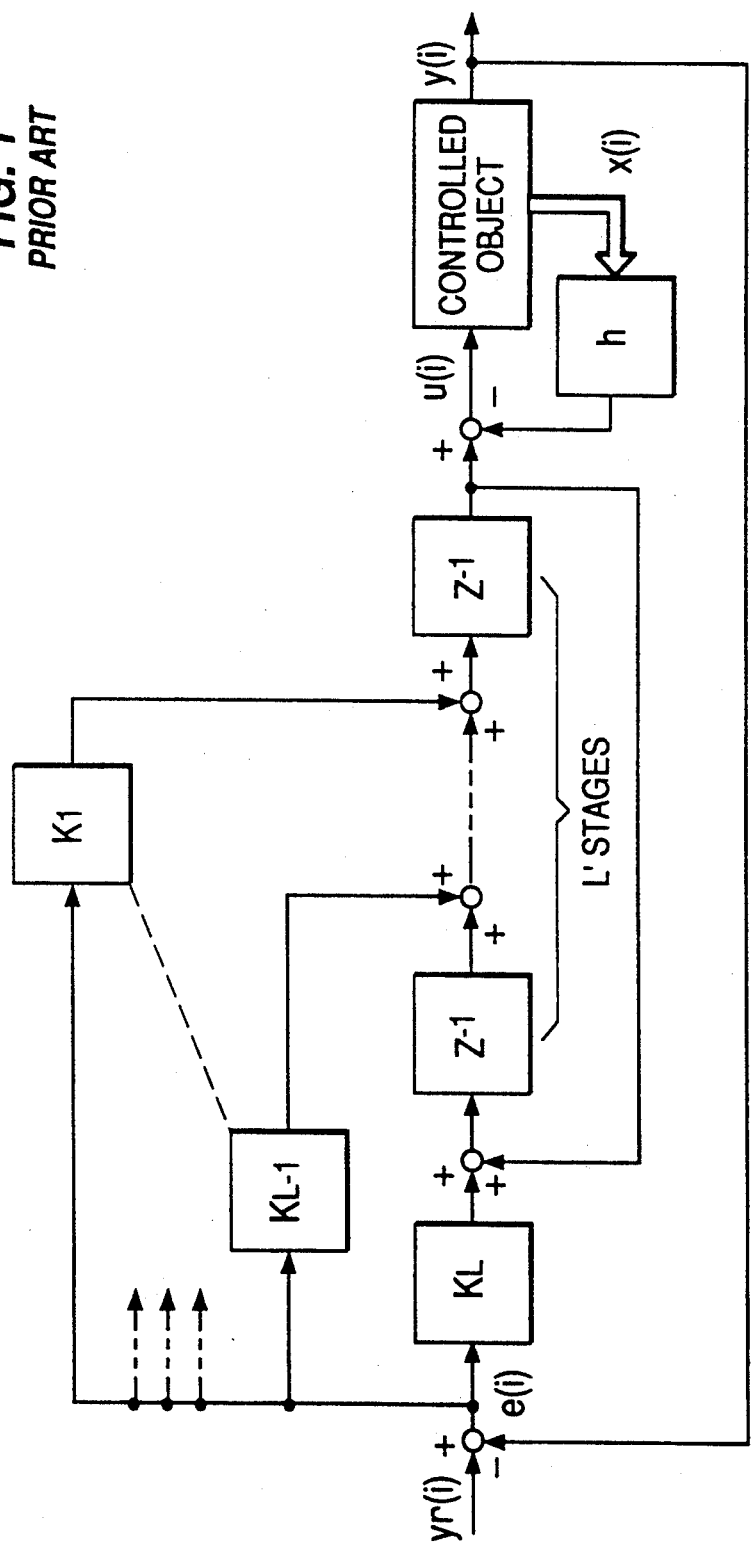
FIG. 1 is a block diagram exemplarily showing a conventional repetitive control system.
Figure 4:
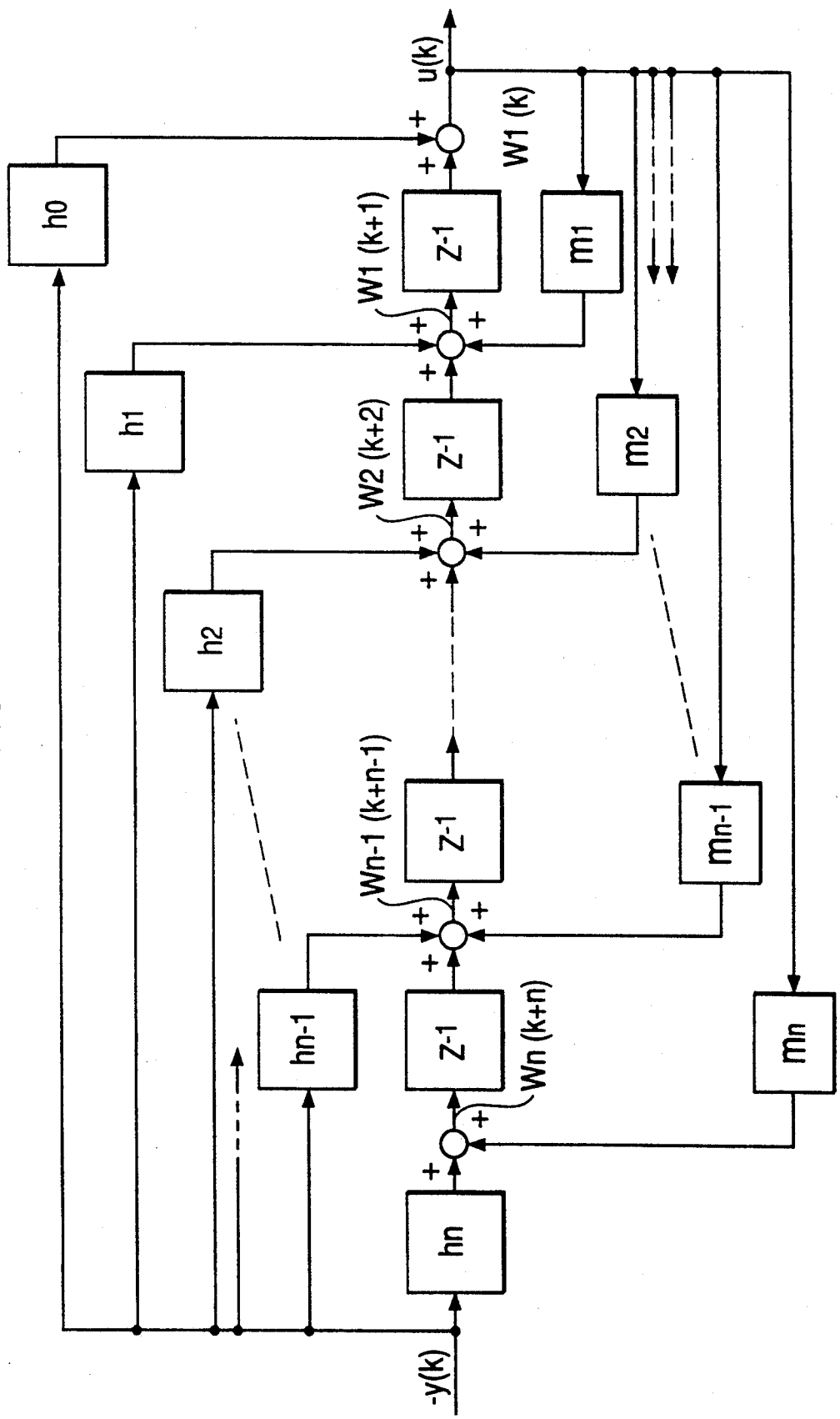
FIG. 4 is a block diagram showing a series compensator for embodying the feedback control rule according to an embodiment of the present invention.

The feedback control rule for embodying the discrete-type repetitive control method of this embodiment is represented by the foregoing equations (10-1), (12), (13), and (14-2) to (14-n). A series compensator corresponding to this feedback control rule is shown in FIG. 4. In the case of embodying the repetitive control of the embodiment by the use of the series compensator, the deviation $yr(k) - y(k)$ between the cyclic target input $yr(k)$ (FIG. 1) and the output $y(k)$ of the controlled object (FIG. 2) is applied, in place of the input $-y(k)$ shown in FIG. 4, to the series compensator.

In other words, the discrete-type repetitive control unit for embodying the repetitive control method of the embodiment comprises the series compensator of FIG. 4. If necessary, the control unit also includes a sampling circuit (e.g., a sample-and-hold circuit), represented by the junction (FIG. 4) of a $-y(k)$ signal input line and a gain element hj, for periodically sampling the deviation between the output of the controlled object and the cyclic target input. If the sampling circuit is provided outside the control unit, or if a quantized deviation is periodically applied to the control unit, then it is unnecessary to provide the sampling circuit inside the control unit. Meanwhile, the repetitive control unit may be configured by a digital unit, e.g., a digital controller, for achieving the functions of the series compensator of FIG. 4.

Further explanations will be given with reference to FIG. 4. The repetitive control unit comprises time delay elements $Z^{-1}$ connected in series with each other. The number of time delay elements provided is equal to or greater than a value obtained by dividing the cycle period of the cyclic target input by the deviation sampling period. Preferably, the elements are equal in number to an integer obtained by counting fractions of decimals of a resultant value of division as a whole number (i.e., rounding up any remainder to increment the quotient by one). Each of first gain elements h1–hn is interposed between the sampling circuit and a corresponding one of the time delay elements $Z^{-1}$. Generally, each gain element is disposed on the input side of a time delay element $Z^{-1}$. Further, a corresponding one of first adder elements is interposed between each of the time delay elements and an associated one of the first gain elements h1, - - -, or hn, and a corresponding one of second gain elements m1-mn is interposed between the input side of the controlled object and each of the first adder elements. Further, a second adder element is interposed between the input side of the controlled object and the last time delay element $Z^{-1}$ connected thereto, and a third gain element h0 is provided between the sampling circuit and the second adder element (generally, on the input side of the second adder element).

During the operation of the repetitive control unit, periodically applied to each of the time delay elements $Z^{-1}$ is the sum of the product of the deviation $yr(k)-y(k)$ and the first gain h1, - - -, or hn associated with the time delay element, the product of the input $u(k)$ to the controlled object and the second gain m1, - - -, or mn associated with the time delay element, and the output $Wp(k+p)$ (P=1, - - -, n) of the preceding time delay element. In the meantime, at least one of the first gains h1–hn and the second gains m1–mn may be zero. Further, the sum (series compensator output) $u(k)$ of the product of the deviation and the third gain h0, and the output $W1(k)$ of the time delay element disposed on the controlled object side is periodically applied to the controlled object 1 (FIG. 2).

The controlled object 1 operates in a stable manner, with no substantial delay to the cyclic target input, in accordance with the repetitive control output $u(k)$ responsive to the cyclic target input $yr(k)$ which changes periodically in a single changing pattern, so that the controlled object repeats a single patterned action.

According to the repetitive control unit which corresponds to the series compensator of FIG. 4, repetitive control with a minimized delay to the cyclic target input can be achieved. As is apparent from FIG. 4, the repetitive control unit can be configured even if the state variable x of the controlled object 1 is not observable directly. Further, the number of the time delay elements $Z^{-1}$ to be included in the repetitive control unit is not necessarily equal to the value obtained by dividing the cycle period of the cyclic target input by the deviation sampling period, as long as it is equal to or greater than such a value. In other words, the repetitive control unit provides excellent flexibility for response to variation in the cycle period of the cyclic target input.

What is claimed is:

1. A discrete-type repetitive control method comprising the steps of:
   (a) receiving a cyclic target input;
   (b) periodically sampling an input of a controlled object and a deviation between the cyclic target input and an output of the controlled object;
   (c) multiplying the deviation sampled in step (b) times each of a plurality of a first gains associated with a plurality of time delay elements to produce a first product associated with each time delay element;
   (d) multiplying the input of the controlled object times each of a plurality of second gains associated with the time delay elements to produce a second product associated with each time delay element;
   (e) multiplying the deviation sampled in step (b) times a third gain to produce a third product;
   (f) applying, to each of the time delay elements, numbering not less than a value obtained by dividing the input cycle period by the sampling period, a sum of the first product associated with the time delay element, the second product associated with the time delay element and an output of a preceding time delay element, when one exists; and
   (g) periodically applying, to the controlled object, a sum of the third product and an output of a final time delay element.

2. The discrete-type repetitive control method according to claim 1, wherein at least one of the first gains and the second gains is zero.

3. A discrete-type repetitive control unit for controlling a controlled object in accordance with a cyclic target input, comprising:

time delay elements, numbering not less than a value obtained by dividing a cycle period of the cyclic target input by a sampling period of a sampled deviation between an output of the controlled object and the cyclic target input, said time delay elements connected in series with each other and each producing an output;

first gain elements, each corresponding to one of said time delay elements, operatively connected to receive the sampled deviation and producing an output;

second gain elements, each operatively connected to receive an input of the controlled object, corresponding to one of said time delay elements and producing an output;

first adder elements, each operatively connected to supply an output to a corresponding time delay element and to receive the output from corresponding first and second gain elements and from a preceding time delay element except when the corresponding time delay element is a first time delay element;

a third gain element operatively connected to receive the sampled deviation and producing an output; and a second adder element operatively connected to supply the input of the controlled object and to receive the output of a last time delay element and the third gain element.

4. The discrete-type repetitive control unit according to claim 3, further comprising:

a sampling circuit, operatively connected to the first and third gain elements and to receive the cyclic target input and the output of the controlled object for periodically producing the sampled deviation.

5. The discrete-type repetitive control unit according to claim 3, wherein at least one of said first gain elements and said second gain elements has a gain of zero.

6. The discrete-type repetitive control unit according to claim 3, wherein the number of said time delay elements is equal to an integer obtained by dividing the cycle period of the cyclic target input by the sampling period of the deviation and rounding up any remainder.

* * * * *

UNITED STATES PATENT AND TRADEMARK OFFICE
CERTIFICATE OF CORRECTION

PATENT NO. : 5,220,265

DATED : June 15, 1993

INVENTOR(S) : Araki et al.

It is certified that error appears in the above-indentified patent and that said Letters Patent is hereby corrected as shown below:

Col. 1, line 48, "diso-" should be --discrete-type--;

line 49, delete "rete-type".

Col. 5, line 63, delete "154n)".

Signed and Sealed this

Nineteenth Day of April, 1994

Attest:

BRUCE LEHMAN

*Attesting Officer*    *Commissioner of Patents and Trademarks*